United States Patent
Shinohara et al.

(10) Patent No.: US 9,637,606 B2
(45) Date of Patent: May 2, 2017

(54) MOLDED ARTICLE OF POLYLACTIC ACID-BASED RESIN EXPANDED BEADS

(71) Applicant: JSP CORPORATION, Tokyo (JP)

(72) Inventors: Mitsuru Shinohara, Yokkaichi (JP); Masaharu Oikawa, Yokkaichi (JP)

(73) Assignee: JSP CORPORATION, Tokyo (JP)

( * ) Notice: Subject to any disclaimer, the term of this patent is extended or adjusted under 35 U.S.C. 154(b) by 0 days.

(21) Appl. No.: 14/698,001

(22) Filed: Apr. 28, 2015

(65) Prior Publication Data

US 2015/0315351 A1    Nov. 5, 2015

(30) Foreign Application Priority Data

May 1, 2014   (JP) .................................. 2014-94864

(51) Int. Cl.
| | | |
|---|---|---|
| *C08J 9/16* | (2006.01) | |
| *C08J 9/228* | (2006.01) | |
| *C08J 9/232* | (2006.01) | |
| *C08J 9/00* | (2006.01) | |

(52) U.S. Cl.
CPC ............. *C08J 9/0061* (2013.01); *C08J 9/232* (2013.01); *C08J 2367/04* (2013.01)

(58) Field of Classification Search
None
See application file for complete search history.

(56) References Cited

U.S. PATENT DOCUMENTS

2012/0225272 A1* 9/2012 Costeux ................. C08J 9/0023
428/220

FOREIGN PATENT DOCUMENTS

| EP | 1378538 A1 | 1/2004 |
|---|---|---|
| EP | 2573133 A1 | 3/2013 |
| EP | 2657279 A1 | 10/2013 |
| JP | S41-16125 A | 9/1966 |
| JP | S43-23858 A | 10/1968 |
| JP | S44-29522 A | 12/1969 |
| JP | 60-185816 A | 9/1985 |
| JP | 2011-213906 A | 10/2011 |

OTHER PUBLICATIONS

European Search Report dated Aug. 25, 2015, for EP 15001237.

* cited by examiner

*Primary Examiner* — Kara Boyle
(74) *Attorney, Agent, or Firm* — Bacon & Thomas, PLLC

(57) ABSTRACT

A polylactic acid-based resin foamed molded article having a voidage of 5 to 45% by volume, a bulk density BD [g/cm$^3$] of 0.01 to 0.2 g/cm$^3$ and a ratio FT/BD of a flexural strength FT [MPa] thereof to the bulk density BD in the range of 6 to 25 MPa·cm$^3$/g.

8 Claims, 2 Drawing Sheets

MOLDED ARTICLE OF POLYLACTIC ACID-BASED RESIN EXPANDED BEADS

FIELD OF THE INVENTION

The present invention relates to a molded article of polylactic acid-based resin expanded beads and, more specifically, to a molded article of polylactic acid-based resin expanded beads which has void spaces between the expanded beads.

DESCRIPTION OF PRIOR ART

Foam products formed of general-purpose resins such as polyethylene, polypropylene and polystyrene resins are now used in various fields because of their good heat insulating property, cushioning property and lightness in weight.

In recent years, with an increase of the consciousness on global environment, environmental problems such as depletion of petroleum resources are now close up. In this circumstance, in lieu of the above-described general-purpose resins produced from the petroleum resources, attention is now being paid upon polylactic acid which is a "carbon neutral" material.

Polylactic acid is produced from a plant such as corn as a starting material and is a thermoplastic resin that is regarded as being of a low environmental load type from the standpoint of carbon neutral. An attempt has been made to use such polylactic acid as an environmentally gentle, plant-derived resin for foams. Thus studies are being made on foams made of polylactic acid as a raw material. For instance, Japanese Kokai Publication No. JP-A-2011-213906 discloses a molded article that is obtained from expanded beads formed of polylactic acid.

It is generally more difficult to produce foamed molded articles of polylactic acid expanded beads than to produce foamed molded articles of general purpose resin expanded beads, because the degree of crystallinity of the polylactic acid has a great influence on the moldability of the expanded beads. For example, a foamed molded article of polylactic acid expanded beads that have a low degree of crystallinity is not good in its dimensional stability and strength. When polylactic acid having a high degree of crystallinity is used, on the other hand, it is difficult to produce a foamed molded article of expanded beads having high fusion bonding strength between the expanded beads. These problems are of great concern for the production of a molded article of polylactic acid-based resin expanded beads that has void spaces between the expanded beads, because an increase of void spaces between the expanded beads will generally result in lowering of fusion bonding strength therebetween and in an increased tendency toward shrinkage.

SUMMARY OF THE INVENTION

With the above problems in view, it is an object of the present invention to provide a molded article of polylactic acid-based resin expanded beads which has void spaces between the expanded beads and yet which has good fusion-bonding strength there between and suitable mechanical strength.

In accomplishing the foregoing objects, there is provided in accordance with the present invention:

[1] A polylactic acid-based resin foamed molded article having a voidage of 5 to 45% by volume, a bulk density BD [g/cm$^3$] of 0.01 to 0.2 g/cm$^3$ and a ratio FT/BD of a flexural strength FT [MPa] thereof to the bulk density BD in the range of 6 to 25 MPa·cm$^3$/g.

The present invention also provides:

[2] The polylactic acid-based resin foamed molded article according to above [1], wherein said polylactic acid-based resin foamed molded article is obtained by molding polylactic acid-based resin expanded beads that show at least one high temperature peak having a peak top temperature higher than a reference temperature and at least one low temperature peak having a peak top temperature equal to or lower than the reference temperature on a first heating run DSC curve obtained when a measurement sample from the polylactic acid-based resin expanded beads is heated from 23° C. to a first temperature higher by 30° C. than a fusion peak ending temperature at a heating speed of 10° C./min according to heat flux differential scanning calorimetry referenced in JIS K7122 (1987), wherein said reference temperature is a peak top temperature of an endothermic peak that is located on the highest temperature side on a second heating run DSC curve obtained when the measurement sample, after having been maintained at said first temperature for 10 minutes and then cooled to 30° C. at a cooling speed of 10° C./min, is heated from 30° C. to a second temperature higher by 30° C. than a fusion peak ending temperature at a heating speed of 10° C./min according to heat flux differential scanning calorimetry referenced in JIS K7122 (1987);

[3] The polylactic acid-based resin foamed molded article according to above [2], wherein said at least one high temperature peak has a total calorific value (total heat of fusion) of 5 to 20 J/g;

[4] The polylactic acid-based resin foamed molded article according to above [2] or [3], wherein the expanded beads have a closed cell content of at least 80%; and

[5] The polylactic acid-based resin foamed molded article according to any one of above [2] to [4], wherein each of the expanded beads comprises:

an exterior surface,
a surface region including an entirety of the exterior surface and having a weight of one-sixth to one-fourth the weight of the expanded bead, and
a center region located inside the surface region and having a weight of one-fifth to one-third the weight of the expanded bead,
wherein said expanded bead, said surface region and said center region show endothermic calorific values of (Br:endo) [J/g], (Brs:endo) [J/g] and (Brc:endo) [J/g], respectively, when measurement samples from said expanded bead, said surface region and said center region are each heated, after having been subjected to a pretreatment, by heat flux differential scanning calorimetry from 40° C. at a heating speed of 2° C./min in accordance with JIS K7122 (1987), said pretreatment including maintaining the measurement sample at a temperature higher by 30° C. than a fusion peak ending temperature thereof for 10 minutes, then cooling the molten measurement sample to 110° C. at a cooling speed of 2° C./min, then maintaining the cooled measurement sample at 110° C. for 120 min, and then cooling the resulting measurement sample to 40° C. at a cooling speed of 2° C./min, and
wherein (Br:endo), (Brs:endo) and (Brc:endo) meet the following equations (1) and (2):

$$(Br:endo) > 25 \tag{1}$$

$$(Brc:endo) > (Brs:endo) \geq 0 \tag{2}$$

The molded article according to the present invention may be produced from polylactic acid-based resin expanded beads. Whilst it has been hitherto difficult to perform in-mold molding of polylactic acid-based resin expanded beads due to their tendency to change their crystallinity degree, the molded article of the present invention shows high fusion bonding strength between the expanded beads and, yet, has appropriate void spaces therebetween useful for multi-purpose applications.

BRIEF DESCRIPTION OF DRAWINGS

Other objects, features and advantages of the present invention will become apparent from the detailed description of the preferred embodiments of the invention which follows, when considered in light of the accompanying drawings, in which.

DETAILED DESCRIPTION OF THE INVENTION

Figure 1:
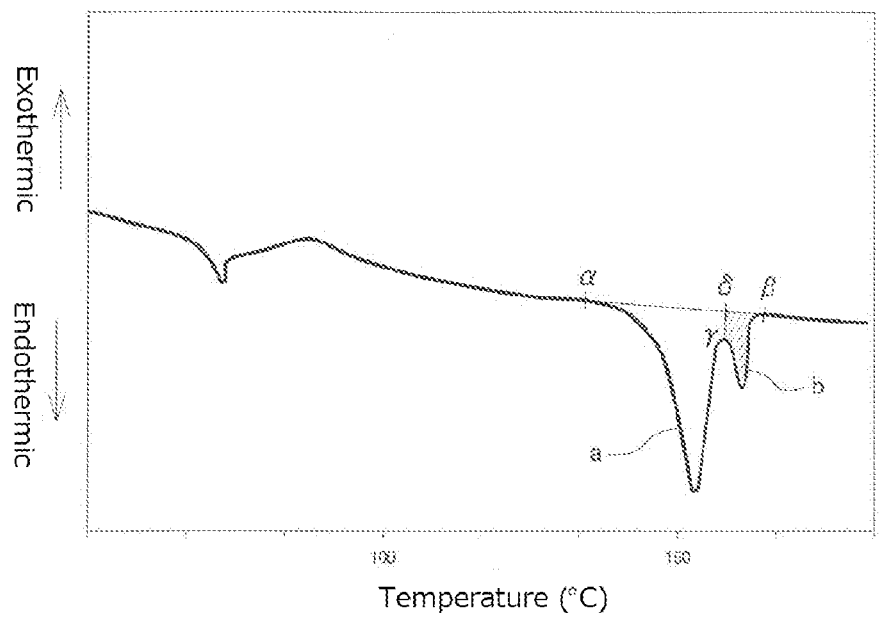
FIG. 1 illustrates an example of a first heating run DSC curve (I) of a measurement sample as measured by a heat flux differential scanning calorimeter.

The polylactic acid-based resin foamed molded article may be obtained by heating polylactic acid-based resin expanded beads in a mold cavity to fuse-bond the polylactic acid-based resin expanded beads together. The term "polylactic acid-based resin foamed molded article" and the term "polylactic acid-based resin expanded beads" will be hereinafter occasionally referred to simply as "molded article" and "expanded beads", respectively. The term "polylactic acid-based resin" will be hereinafter occasionally referred to simply as "PLA resin".

The PLA resin may be polylactic acid or a mixture of polylactic acid with other resin or resins. The polylactic acid is preferably a polymer containing at least 50 mol % of component units derived from lactic acid. Examples of the polylactic acid include (a) a polymer of lactic acid, (b) a copolymer of lactic acid with other aliphatic hydroxycarboxylic acid or acids, (c) a copolymer of lactic acid with an aliphatic polycarboxylic acid and an aliphatic polyhydric alcohol, (d) a copolymer of lactic acid with an aliphatic polycarboxylic acid, (e) a copolymer of lactic acid with an aliphatic polyhydric alcohol, and (f) a mixture of two or more of (a)-(e) above. Examples of the polylactic acid also include so-called stereocomplex polylactic acid and stereoblock polylactic acid. Specific examples of the lactic acid include L-lactic acid, D-lactic acid, DL-lactic acid, a cyclic dimer thereof (i.e. L-lactide, D-lactide or DL-lactide) and mixtures thereof.

In the present invention, preferably used is polylactic acid which gives the expanded beads satisfying conditions (1) and (2) described hereinafter and which has a ratio of lactic acid isomers (D-isomer/L-isomer) of 99:1 to 94:6 or 6:94 to 1:99, particularly preferably 97:3 to 94:6 or 6:94 to 3:97. It is also preferred that the polylactic acid has a melting point (Tm) of 135 to 175° C., more preferably 145 to 175° C.

Examples of other aliphatic hydroxycarboxylic acid in (b) above include glycolic acid, hydroxybutyric acid, hydroxyvaleric acid, hydroxycaproic acid and hydroxyheptoic acid. Examples of the aliphatic polyhydric alcohol in (c) and (e) above include ethylene glycol, 1,4-butanediol, 1,6-hexanediol, 1,4-cyclohexanedimethanol, neopentyl glycol, decamethylene glycol, glycerin, trimethylolpropane and pentaerythritol. Examples of the aliphatic polycarboxylic acid in (c) and (d) above include succinic acid, adipic acid, suberic acid, sebacic acid, dodecanedicarboxylic acid, succinic anhydride, adipic anhydride, trimesic acid, propanetricarboxylic acid, pyromellitic acid and pyromellitic anhydride.

Polylactic acid used in the present invention is preferably capped at its molecular chain ends. By this, it is possible to surely suppress hydrolysis during the course of the preparation of expanded beads, so that the dispersing medium release foaming method (hereinafter described) can be much easily carried out. Namely, it becomes easy to reliably form and control a high temperature peak on its first heating run DSC curve (hereinafter described). Thus, it becomes easy to produce expanded beads that are capable of withstanding in-mold molding. Additionally, a molded article obtained by in-mold molding of the expanded beads has improved durability. In the case of an extrusion molding method, too, it is possible to suppress hydrolysis which is not wanted.

Examples of the end capping agent include carbodiimide compounds, oxazoline compounds, isocyanate compounds and epoxy compounds. Above all, carbodiimide compounds are preferred. Specific examples of the diimide compounds include an aromatic monocarbodiimide such as bis(dipropylphenyl)carbodiimide, an aliphatic polycarbodiimide such as poly(4,4'-dicyclohexylmethanecarbodiimide, and an aromatic polycarbodiimide. These end capping agents may be used alone or in combination of two or more thereof. The using amount of the end capping agent is preferably 0.1 to 5 parts by weight, more preferably 0.5 to 3 parts by weight, per 100 parts by weight of the polylactic acid.

The PLA resin used in the present invention may contain other resin or resins in addition to the polylactic acid as long as the objects and effects of the present invention are not adversely affected. When the PLA resin is a mixed resin composed of polylactic acid and other resin or resins, it is preferred that the polylactic acid is contained in the mixed resin in an amount of at least 50% by weight, more preferably at least 70% by weight, still more preferably at least 90% by weight. It is also preferred that the PLA resin has a content of lactic acid components of at least 50% by weight. Examples of the other resin to be mixed with the polylactic acid include a polyethylene resin, a polypropylene resin, a polystyrene resin, a polyester resin and a polycarbonate resin. Above all, the use of a biodegradable aliphatic polyester resin containing at least 35 mol % of aliphatic ester component units is preferred. Examples of the aliphatic polyester resin include a polycondensation product of a hydroxyacid other than the PLA resins, a ring open polymerization product of a lactone (e.g. polycaprolactone), and a polycondensation product of an aliphatic polyhydric alcohol with an aliphatic polycarboxylic acid or/and an aromatic polycarboxylic acid, such as polybutylene succinate, polybutylene adipate, polybutylene succinate adipate and poly(butylene adipate/terephthalate).

It is preferred that the expanded beads used for the preparation of the molded article of the present invention, when subjected to heat flux differential scanning calorimetry (DSC) under the Condition 1 described below, should give a first heating run DSC curve (I) and a second heating run DSC curve (I) as follows. In the first heating run DSC curve (I), there appear at least one fusion peak (hereinafter occasionally referred to as "high temperature peak") having a peak top temperature which is higher than a reference temperature, and another at least one fusion peak (hereinafter occasionally referred to as "intrinsic peak") having a peak top temperature which is not higher than the reference temperature. The reference temperature is a peak top temperature of a fusion peak of the second heating run DSC curve (I). When, in the second heating run DSC curve (I), there are a plurality of fusion peaks or when there is a shoulder on high temperature side of a fusion peak, the reference temperature in the second heating run DSC curve (I) is defined as the peak top temperature of the fusion peak or the flection point temperature of the shoulder that is the highest among the peak top temperatures of the fusion peaks and the flection point temperatures of the shoulders.

Incidentally, the above feature with respect to the DSC characteristics of the expanded beads that are used for producing the molded article is the same as the feature of the expanded beads that are sampled from the molded article. Therefore, in a preferred aspect of the present invention, there is provided a polylactic acid-based resin foamed molded article comprising a multiplicity of polylactic acid-based resin expanded beads that are fusion-bonded to each other to define void spaces therebetween, said polylactic acid-based resin foamed molded article having a voidage of 5 to 45% by volume, a bulk density BD [g/cm$^3$] of 0.01 to 0.2 g/cm$^3$ and a ratio FT/BD of a flexural strength FT [MPa] thereof to the bulk density BD in the range of 6 to 25 MPa·cm$^3$/g, wherein said expanded beads show at least one high temperature peak having a peak top temperature higher than a reference temperature and at least one low temperature peak having a peak top temperature equal to or lower than the reference temperature on a first heating run DSC curve obtained when a measurement samples from the expanded beads is heated from 23° C. to a first temperature higher by 30° C. than a fusion peak ending temperature at a heating speed of 10° C./min according to heat flux differential scanning calorimetry referenced in JIS K7122 (1987), wherein said reference temperature is a peak top temperature of an endothermic peak that is located on the highest temperature side on a second heating run DSC curve obtained when the measurement sample, after having been maintained at said first temperature for 10 minutes and then cooled to 30° C. at a cooling speed of 10° C./min, is heated from 30° C. to a second temperature higher by 30° C. than a fusion peak ending temperature at a heating speed of 10° C./min according to heat flux differential scanning calorimetry referenced in JIS K7122 (1987).

Condition 1
Method for Measuring First and Second Heating Run DSC Curves (I):

The first and second heating run DSC curves (I) are measured and defined as follows:
(a) a measurement sample of the expanded beads is subjected to heat flux differential scanning calorimetry measurement according to JIS K7122 (1987) by heating the measurement sample at a heating rate of 10° C./minute from 23° C. to a first temperature higher by 30° C. than the temperature at which the endothermic peak ends, thereby obtaining the first heating run DSC curve (I);

(b) the measurement sample is then maintained for 10 minutes at the first temperature higher by 30° C. than the temperature at which the endothermic peak ends in the first heating run DSC curve;
(c) the measurement sample is then cooled to 30° C. at a cooling rate of 10° C./minute;
(d) the measurement sample is then measured again for another DSC curve by being heated at a heating rate of 10° C./minute to a second temperature higher by 30° C. than the temperature at which the endothermic peak ends, thereby obtaining the second heating run DSC curve (I).

It is believed that because the expanded beads, which show the high temperature peak, have improved heat resistance and rigidity at high temperatures and are prevented from excessively secondarily expanding during in-mold molding of the expanded beads, a heating medium is permitted to sufficiently heat the expanded beads located all parts in the mold cavity. As a result, the fusion bonding of the expanded beads during the in-mold molding is improved while making it possible to produce the molded article having void spaces. It follows that the obtained molded article shows excellent fusion bonding between the expanded beads even when void spaces are formed between the bonded expanded beads and even when the thickness thereof is large or the shape thereof is complicated.

The above-described high temperature peak appears on a first heating run DSC curve (I) obtained in the DSC measurement of the expanded beads, but does not appear in a second heating run DSC curve (I). The high temperature peak that appears in the first heating run DSC curve (I) is attributed to crystals that have grown during a thermal treatment of the expanded beads which will be described hereinafter. That is, such a high temperature peak in the first heating run DSC curve (I) is considered to be ascribed to secondary crystals formed through the thermal history in a process for expanding resin particles to obtain the expanded beads. On the other hand, the endothermic peak that appears in the second heating run DSC curve (I) of the expanded beads is a fusion peak which is attributed to the intrinsic crystal structure of the PLA resin.

Figure 2:
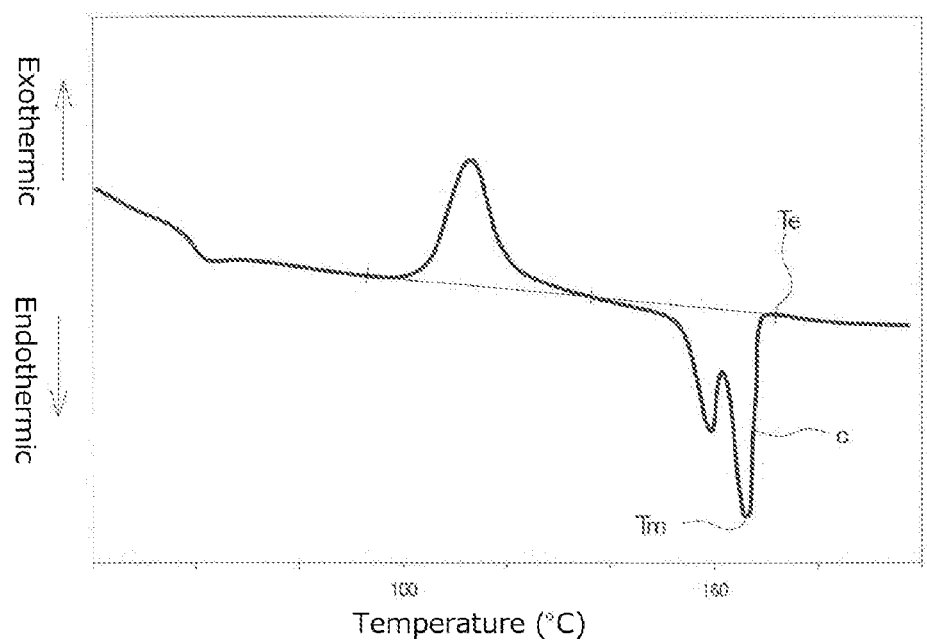
FIG. 2 illustrates an example of a second heating run DSC curve (I)

FIG. 1 and FIG. 2 illustrate examples of the first and second heating run DSC curves (I), respectively, of expanded beads. In order to investigate existence of a high temperature peak of the expanded beads, the reference temperature is determined from the second heating run DSC curve (I) of FIG. 2. Since, by definition, the reference temperature is a peak top temperature that is the highest among the peak top temperatures of the fusion peaks, the peak top temperature of the fusion peak "c" in FIG. 2 represents the reference temperature. In the first heating run DSC curves (I) of FIG. 1, there is a fusion peak "b" whose peak top temperature is higher than the above-determined reference temperature. Thus, the expanded beads have a high temperature peak "b". In FIG. 1, there is a fusion peak "a" whose peak top temperature is not higher than the above-determined reference temperature. The fusion peak "a" represents the intrinsic peak.

Incidentally, a peak top temperature of a fusion peak that has the largest area among fusion peaks in the second heating run DSC curve (I), for example, the peak top temperature of the fusion peak "c" in FIG. 2, is defined as a melting point Tm of the PLA resin that constitutes the expanded beads. In FIG. 2, the temperature at which the skirt on a high temperature-side of the fusion peak (peak "c") returns to the base line is defined as a fusion peak ending temperature Te.

Although the DCS curve shown in FIG. 1 has smooth two fusion peaks "a" and "b", DSC curves are not always simple. There are cases where a plurality of overwrapped fusion peaks appear in DSC curves so that one or more intrinsic peaks and one or more high temperature peaks are present in the DSC curves.

The calorific value (heat of fusion) (J/g) of the high temperature peak is determined from the first heating run DSC curve (I) shown in FIG. 1 as follows. A straight line segment connecting a point α at which an endothermic peak begins separating from a low temperature-side base line and a point β at which the endothermic peak returns to a high temperature-side base line is drawn. Next, a line which is in parallel with the ordinate and which passes a point γ on the DSC curve at the bottom of the valley between the intrinsic peak "a" and the high temperature peak "b" is drawn. This line intersects the straight line (α-β) at point δ. The calorific value (heat of fusion) of the high temperature peak corresponds to the area (shaded portion in FIG. 1) defined by the line segments (γ-δ) and (δ-β) and the part of the DSC curve forming the high temperature peak "b". Incidentally, there is a case where an exothermic peak contiguous with the fusion peak "a" appears in the low-temperature side of the fusion peak "a" (this is not the case in FIG. 1), which makes it difficult to determine the point α at which the fusion peak begins separating from the low temperature-side base line. In such a case, the point α is determined as a point at which the exothermic peak begins separating from the low temperature-side base line.

The endothermic calorific value of the high temperature peak (a total endothermic calorific value of the fusion peaks when the high temperature peak is constituted of a plurality of fusion peaks) is preferably 5 to 20 J/g for reasons that the fusion bonding strength between expanded beads is high and uniform throughout the molded article. The lower limit of the calorific value of the high temperature peak is more preferably 6 J/g, still more preferably 7 J/g, while the upper limit of the calorific value of the high temperature peak is more preferably 15 J/g, still more preferably 10 J/g.

The molded article according to the present invention has a multiplicity of fusion-bonded expanded beads defining void spaces therebetween and has a voidage of 5 to 45% by volume, preferably 8 to 45% by volume, more preferably 10 to 35% by volume, further more preferably 15 to 30% by volume. The void spaces are preferably interconnected. As a consequence of the void spaces, the molded article may be used as an air permeable material, a water permeable material, a sound proof material, a cushioning material, a light weight material or the like material.

As used herein, the voidage of a molded article is determined as follows. The molded article is placed in an environment with a temperature of 23° C. and a relative humidity of 50% for at least 24 hours. A test piece in a cuboid shape with a size of 20 mm×15 mm×80 mm is then cut out from the molded article in such a way that no skin of the molded article remains present on the surfaces of the test piece. An apparent volume Va of the test piece is determined from the external dimension. The test piece is also measured for its true volume Vt by being immersed in a 200 mL measuring cylinder containing about 120 mL of ethanol at 23° C. using a wire net. From a rise of the liquid level in the measuring cylinder, the true volume Vt is determined. The voidage is calculated by the following equation:

Voidage(%)=[(Va−Vt)/Va]×100.

The molded article has a bulk density BD of 0.01 to 0.2 g/cm³, preferably 0.015 to 0.15 g/cm³, still more preferably 0.02 to 0.1 g/cm³, for reasons of excellency in balance between its strength and lightness in weight.

As used herein, the bulk density BD of the molded article is measured as follows. The molded article is first placed in an environment with a temperature of 23° C. and a relative humidity of 50% for at least 24 hours. Then, the bulk volume of the molded article is determined from the external dimension thereof and the weight of the molded article is precisely measured. The bulk density BD is calculated by dividing the measured weight (g) by the determined bulk volume (cm³).

It is important that the molded article of the present invention shows a ratio FT/BD of a flexural strength FT [MPa] thereof to the bulk density BD in the range of 6 to 25 MPa·cm³/g. The lower limit of the ratio FT/BD is preferably 7 MPa·cm³/g, more preferably 8 MPa·cm³/g. It is difficult to manufacture a molded article having a ratio FT/BD of more than 25 MPa·cm³/g.

When the FT/BD ratio falls within the above range, the molded article exhibits good fusion bonding between the expanded beads. The bonding strength between the expanded beads increases with an increase of the FT/BD ratio. The molded article having the above-specified FT/BD ratio may be obtained by taking the following measures:
(a) reducing the apparent density of the expanded beads;
(b) increasing the calorific value of the high temperature peak expanded beads;
(c) decreasing the internal pressure of the expanded beads; and
(d) reducing the degree of filling of the expanded beads.
By carrying out the in-mold molding of the expanded beads in such a way as to satisfy one or more of the above measures (a)-(d), the above-specified FT/BD ratio may be achieved in the obtained foamed article having a desired voidage.

As used herein, the flexural strength FT is as measured by the following method. A test piece (without skin) having a length of 120 mm, a width of 25 mm and a thickness of 20 mm is cut out from a molded article and is subjected to a bending test in which the test piece is bent at a rate of 10 mm/min according to JIS K7221-1 (1999) to determine the flexural strength FT [MPa].

The molded article is obtained by heating expanded beads in a mold cavity to fuse-bond the expanded beads together. The expanded beads used to produce the molded article of the present invention preferably have a closed cell content of 80% or more, more preferably 85% or more, still more preferably 90% or more from the standpoint of excellence in in-mold moldability of the expanded beads and capability of providing sufficient mechanical strengths of a molded article produced therefrom. Incidentally, the closed cell content of expanded beads remains almost unchanged before and after in-mold molding.

As used herein, the closed cell content of the expanded beads is measured as follows. The expanded beads are allowed to stand for aging in a constant temperature and humidity room at 23° C. under atmospheric pressure and a relative humidity of 50% for 10 days. In the same room, about 20 cm³ bulk volume of the expanded beads thus aged are sampled and measured for the precise apparent volume Va by a water immersion method. The sample whose apparent volume Va has been measured is fully dried and measured for its true volume Vx according to Procedure C of ASTM D-2856-70 using Air Comparison Pycnometer Type-930 manufactured by Toshiba Beckman Inc. From the volumes Va and Vx, the closed cell content is calculated by the formula shown below. The average (N=5) is the closed cell content of the expanded beads.

Closed cell content(%)=$(Vx-W/\rho)\times 100/(Va-W/\rho)$ wherein

Vx represents the true volume (cm³) of the expanded beads measured by the above method, which corresponds to a sum of a volume of the resin constituting the expanded beads and a total volume of all the closed cells of the expanded beads, Va represents an apparent volume (cm³) of the expanded beads, which is measured by a rise of the water level when the expanded beads are immersed in water contained in a measuring cylinder, W is a weight (g) of the sample expanded beads used for the measurement; and $\rho$ is a density (g/cm³) of the resin constituting the expanded beads.

It is preferred that each of the expanded beads used for producing the molded article of the present invention comprises: an exterior surface; a surface region including an entirety of the exterior surface and having a weight of one-sixth to one-fourth the weight of the expanded bead; and a center region located inside the surface region and having a weight of one-fifth to one-third the weight of the expanded bead, and that the expanded bead, surface region and center region show endothermic calorific values (heat of fusion) of (Br:endo) [J/g], (Brs:endo) [J/g] and (Brc:endo) [J/g], respectively, when measurement samples of the expanded bead, surface region and center region are each heated, after having been subjected to a specific pretreatment, by heat flux differential scanning calorimetry from 40° C. at a heating speed of 2° C./min in accordance with JIS K7122 (1987). The specific pretreatment includes maintaining the measurement sample at a temperature higher by 30° C. than a fusion peak ending temperature thereof for 10 minutes, then cooling the molten measurement sample to 110° C. at a cooling speed of 2° C./min, then maintaining the cooled measurement sample at 110° C. for 120 min, and then cooling the resulting measurement sample to 40° C. at a cooling speed of 2° C./min. The endothermic calorific values (Br:endo), (Brs:endo) and (Brc:endo) meet the following equations (1) and (2):

$(Br:endo)>25$ (1)

$(Brc:endo)>(Brs:endo)\geq 0$ (2).

Stated otherwise, it is preferred that an endothermic calorific value (Br:endo) [J/g] of each of the expanded beads after the specific pretreatment, which is determined in accordance with heat flux differential scanning calorimetry under the Condition 2 described below, meets the formula (1):

$(Br:endo)>25$ (1)

The fact that (Br:endo) is greater than 25 J/g means that, when the expanded beads are heat treated under such conditions that crystallization of the polylactic acid which constitutes the expanded beads sufficiently proceeds, the amount of the polylactic acid crystal components of the polylactic acid in the expanded bead is not excessively small. Namely, when the heat treatment is carried out sufficiently to increase the degree of crystallinity of the polylactic acid which constitutes the expanded beads, the molded article has an appropriately increased degree of crystallinity. Therefore, there is no fear of excessive reduction of the mechanical strengths and heat resistance such as compressive strength at high temperatures of the molded article. From this point of view, (Br:endo) is preferably 30 J/g or more. The upper limit of (Br:endo) is generally 45 J/g.

It is further preferred that the endothermic calorific value (Brs:endo) [J/g] of a surface region of each of the expanded beads after the specific pretreatment, which is determined in accordance with heat flux differential scanning calorimetry under the Condition 2 described below, and the endothermic calorific value (Brc:endo) [J/g] of a center region of thereof after the specific pretreatment satisfy a relationship represented by the following formula (2):

$(Brc:endo)>(Brs:endo)\geq 0$ (2)

The fact that the above formula (2) is met means that when the expanded beads are heat treated under such conditions that crystallization of the polylactic acid which constitutes the surface region and center region of the expanded beads sufficiently proceeds, the amount of the polylactic acid crystal components that constitute the surface region of the expanded bead is smaller than the amount of the polylactic acid crystal components that constitute the center region of the expanded bead. This means that, when the expanded beads are sufficiently heat treated, the degree of crystallinity of the polylactic acid in the center region is increased. Because of the improved degree of crystallinity of the polylactic acid in the center region of the expanded beads, the expanded beads can meet the above formula (1) and can show improved heat resistance, etc. as a whole. On the other hand, since the polylactic acid in the surface region of the expanded beads has a lower degree of crystallinity as compared with that in the center region of the expanded bead even when the expanded beads are sufficiently heat treated, the softening point of surface region of the expanded beads is low, Therefore, the expanded beads which satisfy the relationship shown in the formula (2) are capable of showing excellent fusion bonding between the expanded beads during an in-mold molding stage, irrespective of the thermal history before and after the fabrication of the expanded beads. From this point of view, the endothermic calorific value (Brs:endo) of the surface region of the expanded bead is preferably 35 J/g or less (inclusive of 0) for reasons of improved fusion bonding property of the expanded bead. For reasons of improved heat resistance and mechanical strengths of the expanded beads, the endothermic calorific value (Brc:endo) of the center region of the expanded beads is preferably 30 to 40 J/g. It is also preferred that between (Brc:endo) and (Brs:endo) there is a difference in calorific value of at least 3 J/g, more preferably at least 4 J/g. Meanwhile, as long as the formula (2) is met, the polylactic acid that constitutes the surface region of the expanded beads may be, for example, non-crystalline polylactic acid, a mixture of non-crystalline polylactic acid and crystalline polylactic acid, a mixture of non-crystalline polylactic acid and a crystalline thermoplastic resin such as a polyethylene resin.

As used herein, the endothermic calorific value (Br:endo) [J/g] of the whole expanded bead, the endothermic calorific value (Brs:endo) [J/g] of a surface region of the expanded bead and the endothermic calorific value (Brc:endo) [J/g] of a center region of the expanded bead are values as determined in accordance with heat flux differential scanning calorimetry referenced in JIS K7122 (1987) under the following Condition 2.

Condition 2

[Preparation of Measurement Samples]

<Sample for Measuring the Endothermic Calorific Value of the Whole Expanded Bead>

The expanded bead is basically used as a measurement sample as such without cutting.

<Sample for Measuring the Endothermic Calorific Value of the Surface Region of the Expanded Bead>

A surface region of the expanded bead, including an exterior surface thereof, is cut out and collected to obtain a measurement sample, such that the entire exterior surface thereof is removed and the measurement sample has a weight of ⅙ to ¼ the weight of the expanded bead before being cut. More specifically, the expanded bead is cut using a cutter knife, microtome or the like for collecting the surface region as the measurement sample. In this case, it should be borne in mind that the entire exterior surface of the expanded bead should be removed and the weight of the surface region removed from the bead should be within the range of ⅙ to ¼ the weight of the expanded bead before being cut. In this case, the thickness of the surface region removed should be as equal as possible.

<Sample for Measuring the Endothermic Calorific Value of the Center Region of the Expanded Bead>

An entire surface portion of the expanded bead is cut away to leave a measurement sample, such that the measurement sample has a weight of ⅕ to ⅓ the weight of the expanded bead before being cut. More specifically, the expanded bead is cut using a cutter knife or the like for the purpose of obtaining an inside region of the foam of the expanded bead which region does not include the exterior surface of the expanded bead. It should be borne in mind that the entire exterior surface of the expanded bead should be removed and a center region of the expanded bead which has a weight of ⅕ to ⅓ the weight of the expanded bead before being cut should be cut out, with the center of the center region being made as close to the center of the expanded bead as possible. In this case, the shape of the measurement sample thus cut out is desired to be as similar as possible to the shape of the expanded bead.

[Measurement of Endothermic Calorific Values]

The calorific values (Br:endo), (Brs:endo) and (Brc:endo) are values as determined from DSC curves obtained as follows. Each of the measurement sample of the expanded bead, the measurement sample obtained from the surface region of the expanded bead and the measurement sample obtained from the center region of the expanded bead is subjected to a specific pretreatment in which 1 to 4 mg of each of them is heated, for melting, to a temperature higher by 30° C. than a fusion peak ending temperature, then maintained at that temperature for 10 minutes, then cooled to 110° C. at a cooling speed of 2° C./min and then maintained at that temperature for 120 min, and then cooling the resulting sample to 40° C. at a cooling speed of 2° C./min. Each of the thus pretreated samples is subsequently heated again, for melting, to a temperature higher by 30° C. than a fusion peak ending temperature at a heating speed of 2° C./min to obtain the DSC curve (hereinafter occasionally referred to as "second heating run DSC curve (II)") in accordance with heat flux differential scanning calorimetry referenced in JIS K7122 (1987). When the amount of the measurement sample for measurement of (Brs:endo) or (Brc:endo) is less than the intended amount of 1 to 4 mg, the above-described sampling procedure should be repeated for two or more expanded beads until the measurement sample in the intended amount of 1 to 4 mg is collected. When the weight of one expanded bead sampled for measurement of (Br:endo) exceeds 4 mg, the expanded bead should be divided into parts with an equal shape (such as into halves) so that the measurement sample has a weight within the range of 1 to 4 mg.

Figure 3:
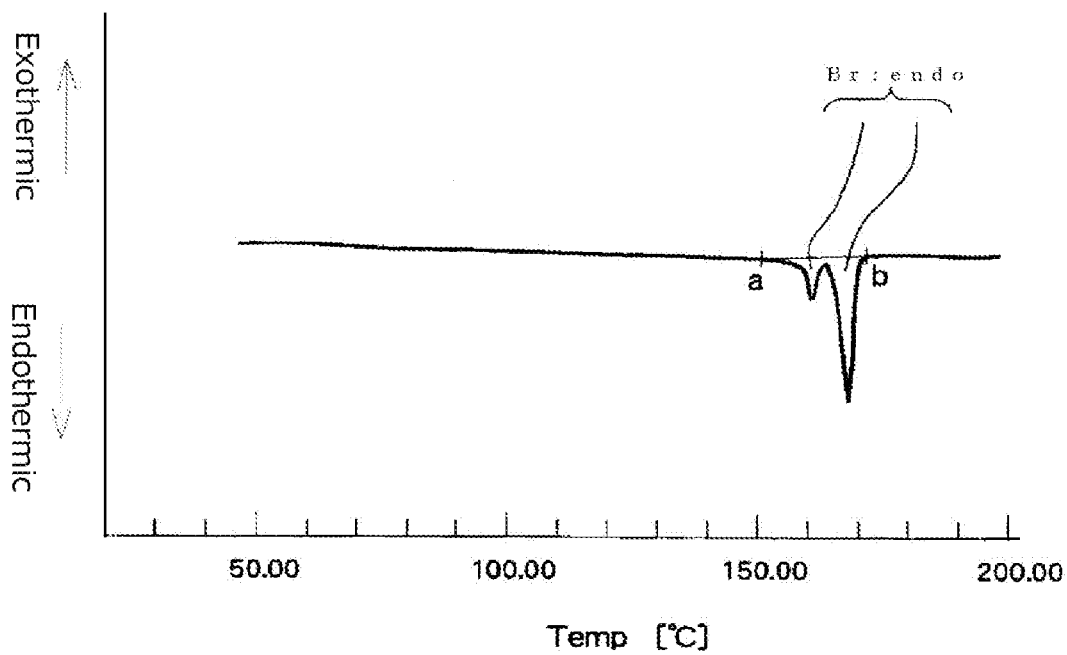
FIG. 3 illustrates an example of a second heating run DSC curve (II) showing an endothermic calorific value (Br:endo) of a measurement sample as measured with a heat flux differential scanning calorimeter.
Figure 4:
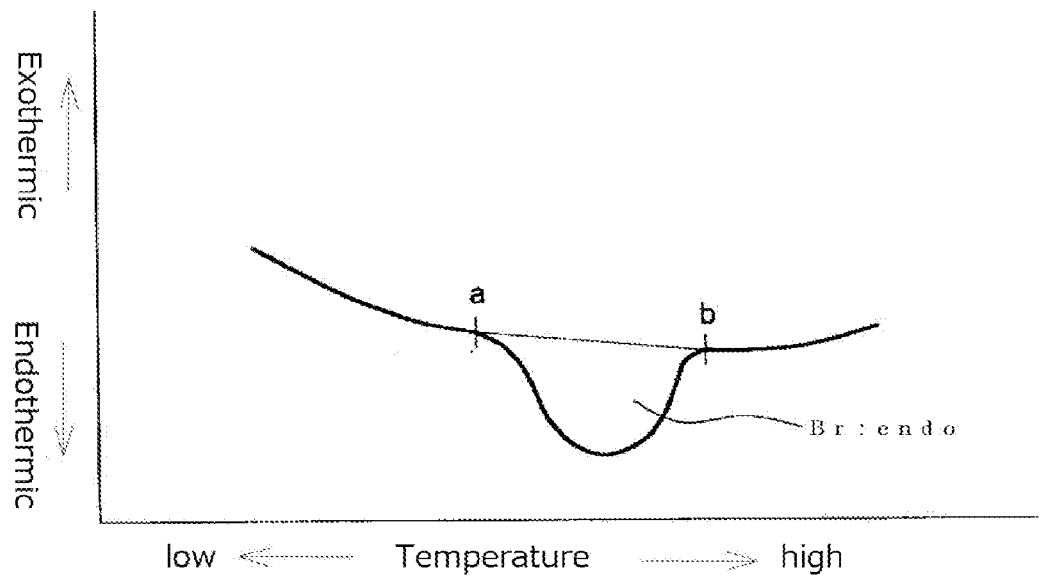
FIG. 4 illustrates another example of a second heating run DSC curve (II) showing an endothermic calorific value (Br:endo) of a measurement sample as measured with a heat flux differential scanning calorimeter.

FIG. 3 shows a second heating run DSC curve (II) in which a point "a" is a point where an endothermic peak begins separating from a low temperature-side base line and a point "b" is a point where the endothermic peak returns to a high temperature-side base line. The endothermic calorific value (Br:endo) is an area defined by a line segment (a-b) and the DSC curve. The DSC device should be preferably operated so that the base line is as straight as possible. When the base line is inevitably curved as shown in FIG. 4, the curved base line on the low temperature side is extended to the high temperature side with the radius of the curvature of the base line being maintained. The point at which the endothermic peak begins separating from the low temperature side curved base line is the point "a". Similarly, the curved base line on the high temperature side is extended to the low temperature side with the radius of the curvature of the base line being maintained. The point at which the endothermic peak returns to the high temperature side curved base line is the point "b". The endothermic calorific values (Brs:endo) and (Brc:endo) may also be obtained from their second DSC curves (II) by drawing base lines in the same manner as in the case of (Br:endo) and may be each determined from the area defined by a line segment (a-b) and the DSC curve.

In the above-described measurement of the endothermic calorific values (Br:endo), (Brs:endo) and (Brc:endo), each of the samples is measured for its DSC curve under conditions including the maintenance at 110° C. for 120 minutes, cooling at a cooling speed of 2° C./min and heating at a heating speed of 2° C./min. This is for the purpose of determining the endothermic calorific values (Br:endo), (Brs:endo) and (Brc:endo) in the state in which crystallization of the PLA resin of each sample has been allowed to proceed as much as possible.

The endothermic calorific values (Br:endo), (Brs:endo) and (Brc:endo) determined from the expanded beads that are used for producing a molded article are the same as those determined from the expanded beads that are sampled from the molded article as long as the sampling of the measurement samples is carried out precisely. Namely, the endothermic calorific values (Br:endo), (Brs:endo) and (Brc:endo), which do not vary depending upon the thermal history of the expanded beads, may be determined according to the above-described Condition 2 from the expanded beads that are used for producing a molded article or alternatively from the expanded beads that are sampled from the molded article.

When the expanded beads used for producing the molded article have the above-described specific endothermic calorific value (Br:endo), the molded article can be imparted with improved mechanical strengths and compressive strength at high temperatures by being heat-treated during or after in-mold molding. Further, when the endothermic calorific value (Brs:endo) of the surface region of the expanded beads is lower than the endothermic calorific value (Brc:endo) of the center region thereof, the softening point of the surfaces of the expanded beads may be maintained in a low level so that the expanded beads show excellent fusion bonding property at the time of in-mold molding.

It is preferred that the expanded beads used to produce the molded article each have a multi-layer structure (hereinafter occasionally referred to as multi-layer expanded beads) which includes a core layer formed of a PLA resin, and an outer layer covering the core layer and formed of another kind of PLA resin. It is not necessary that the outer layer entirely covers the core layer. The resin of which the core layer of the multi-layer expanded beads is formed may be exposed on a part of the exterior surface of the multi-layer expanded beads.

It is also preferred that the softening point (B) [° C.] of the PLA resin of which the outer layer is formed is lower than the softening point (A) [° C.] of the PLA resin of which the core layer is formed and that a difference [(A)−(B)] between the softening point (A) and the softening point (B) be greater than 0° C. and is not greater than 105° C., more preferably from 15 to 105° C., still more preferably from 20 to 105° C. The multi-layer expanded beads that show the above specific range of the difference in softening point may be produced by a method as described hereinafter which includes coextruding PLA resins with softening points (B) and (A) of the outer and core layers, and expanding the obtained multilayered resin particles. It is preferred, from the standpoint of handling efficiency of the multi-layer expanded beads and mechanical strengths at elevated temperatures of molded articles obtained therefrom, that the softening point of the PLA resin of the outer layer not only meets the abovementioned relationship with the softening point of the PLA resin of the core layer but also is 50° C. or more, more preferably 55° C. or more, particularly preferably 65° C. or more. Examples of the suitable PLA resin of the outer layer include non-crystalline PLA resins and mixtures of crystalline and non-crystalline PLA resins.

As used herein, the term "softening point" is intended to refer to a Vicat softening point as measured according to JIS K7206 (1999), Method A50. In particular, a PLA resin is sufficiently dried in a vacuum oven and pressed at 200° C. and 20 MPa (if necessary, air evacuation is carried out so as to prevent inclusion of air bubbles) to obtain a test piece with a length of 20 mm, a width of 20 mm and a thickness of 4 mm. The test piece is annealed in an oven at 80° C. for 24 hours and then measured using, for example, HDT/VSPT tester Model TM-4123 manufactured by Ueshima Seisakusho Co., Ltd.

In the multi-layer expanded beads having the core layer and outer layer, it is preferred that the weight ratio of the resin of which the core layer is formed to the resin of which the outer layer is formed is 99.9:0.1 to 75:25, more preferably 99.7:0.3 to 85:15, still more preferably 99.5:0.5 to 90:10. When the weight proportion of the resin of the outer layer of the multi-layer expanded beads is excessively small, the thickness of the outer layer of the multi-layer expanded beads is so thin that the effect of improving the fusion bonding efficiency of the multi-layer expanded beads in an in-mold molding stage decreases. When the weight proportion of the outer layer is excessively great, there is a possibility that the mechanical properties of the molded article are deteriorated. In the multi-layer expanded beads, the resin forming the outer layer may be expanded as long as the objects and effects of the present invention are not adversely affected.

The weight ratio of the resin of the core layer to the resin of the outer layer in the multi-layer expanded beads may be controlled by controlling the corresponding core layer resin to outer layer resin weight ratio of the multi-layer resin particles (described hereinafter) from which the multi-layer expanded beads are produced.

The above-described end capping agent, when added to the PLA resin forming the multi-layer expanded beads, is preferably incorporated at least in the core layer, more preferably in each of the core and outer layers. When at least the PLA resin of the core layer, preferably the PLA resin of each of the core and outer layers, is modified with the end capping agent, it is possible to further suppress hydrolysis thereof during the course of the preparation of expanded beads, so that expanded beads can be produced in a stable manner. Further, it is also possible to suppress hydrolysis during the course of the preparation of molded articles so that the production efficiency of the molded articles can be produced in a stable manner. Moreover, when the molded articles are subjected to actual use, they are expected to show improved durability and withstand use under a high temperature and high humidity environment.

In the multi-layer expanded beads, the thickness of the outer layer is desired to be thin, because cells are hard to be formed in the outer layer and because mechanical strengths of the expanded beads molded article are improved. When the thickness of the outer layer is excessively low, there may be apprehension that the effect of improving fusion bonding between the multi-layer expanded beads is adversely affected. In actual, however, sufficient fusion bonding improving effect is achieved when the thickness is in the range described below. Namely, the outer layer of the multi-layer expanded beads preferably has an average thickness of 0.1 to 25 μm, more preferably 0.2 to 15 μm, particularly preferably 0.3 to 10 μm. The average thickness of the outer layer of the multi-layer expanded beads may be controlled by a control of the weight ratio of a resin of a core layer to a resin of an outer layer of the multi-layered resin particles during the fabrication thereof. The average thickness of the outer layer of the multi-layered resin particles should be controlled as appropriate in view of the weight of the resin particles and desired expansion ratio, but preferably has an average thickness of 2 to 100 μm, more preferably 3 to 70 μm, particularly preferably 5 to 50 μm.

The average thickness of the outer layer of the multi-layer expanded beads is measured as follows. One multi-layer expanded bead is cut into nearly equal halves. From a photograph of the enlarged cross section of the bead, the thickness of the outer layer in each of the four positions (upper and lower sides, and left and right sides) thereof is measured. The arithmetic mean of the four thickness values is the thickness of the outer layer of the expanded bead. Similar procedures are repeated for a total of 10 expanded beads. The arithmetic mean of the ten thickness values is the average thickness of the outer layer of the expanded beads. The average thickness of the outer layer of the multi-layered resin particles is also measured in a similar manner. In the multi-layer expanded beads and multi-layered resin particles, when the outer layer is formed on parts of the peripheral surface of the core layer, there may arise a case where the thickness of the outer layer cannot be measured in any way at the above four positions. In such a case, the thickness of the outer layer is measured at sixteen randomly selected measurable positions and the arithmetic mean thereof is defined as the thickness of the outer layer of the multi-layer expanded beads or resin particles. Also, when the outer layer of the expanded beads is not easily discriminated, it is preferable to produce the multi-layer expanded beads in such a manner that a suitable colorant is incorporated in the resin of which the outer layer is formed.

It is also preferred that the expanded beads used to produce the molded article are such that an endothermic calorific value (Bfc:endo) [J/g] and an exothermic calorific value (Bfc:exo) of a center region of the expanded bead before being subjected to the heat treatment, which values are determined in accordance with heat flux differential scanning calorimetry referenced in JIS K7122 (1987) under Condition 3 shown below, meet the following formula (3):

$$40 > [(Bfc\text{:endo}) - (Bfc\text{:exo})] > 15 \quad (3)$$

Condition 3
[Preparation of Measurement Sample]
[Measurement Sample for Measuring Endothermic Calorific Value and Exothermic Calorific Value of the Center Region of the Expanded Bead]

In the same manner as the preparation method for the sample for measuring the endothermic calorific value of the center region of the expanded bead that is described in Condition 2, an entire surface portion of the expanded bead is cut away to leave a measurement sample, such that the measurement sample has a weight of ⅕ to ⅓ the weight of the expanded bead before being cut.
[Measurement of Endothermic Calorific Value and the Exothermic Calorific Value]

The endothermic calorific value (Bfc:endo) and the exothermic calorific value (Bfc:exo) are determined from a DSC curve (first heating run DSC curve (II)) obtained by heating, for melting, 1 to 4 mg of the measurement sample, sampled from the center region of the expanded bead, from 23° C. to a temperature higher by 30° C. than a fusion peak ending temperature at a heating speed of 2° C./min in accordance with heat flux differential scanning calorimetry referenced in JIS K7122 (1987). When the amount of the measurement sample from one expanded bead is less than the intended amount of 1 to 4 mg, the above-described sampling procedure should be repeated for a plurality of expanded beads until 1 to 4 mg of a measurement sample is collected.

The difference [(Bfc:endo)−(Bfc:exo)] in the above formula represents a difference between the endothermic calorific value (Bfc:endo) that is an energy absorbed when the crystals, which are originally contained in the center region of the expanded bead before the heat flux differential scanning calorimetry measurement is carried out, and crystals, which have been formed in the center region of the expanded bead during the course of heating in the measurement, are melted and the exothermic calorific value (Bfc:exo) that is an energy emitted when the center region of the expanded bead crystallizes during the course of heating in the heat flux differential scanning calorimetry measurement. The fact that the difference is small means that crystallization of the center region of the expanded bead has not yet proceeded before the heat flux differential scanning calorimetry is carried out, while the fact that the difference is large and is near the endothermic calorific value (Bfc:endo) means that crystallization of the center region of the expanded bead has already fully proceeded before the heat flux differential scanning calorimetry is carried out. The difference [(Bfc:endo)−(Bfc:exo)] is preferably within the above-described range for reasons that good thermal adhesiveness property of the expanded bead during an in-mold molding stage is achieved and the range of the molding temperature within which good the molded articles having void spaces are obtainable becomes wide. The difference is more preferably 35 J/g or less, particularly preferably 30 J/g or less, from the view point of the above-described thermal adhesiveness property.

From the view point of easiness in controlling the temperature of in-mold molding step as well as achievement of the suitable voidage of the molded articles, the difference [(Bfc:endo)−(Bfc:exo)] is more preferably 20 J/g or more.

It is further preferred that the endothermic calorific value (Bfc:endo) of the expanded bead of the present invention is 30 to 70 J/g. With an increase of the endothermic calorific value (Bfc:endo), the degree of crystallinity of the PLA resin of which the expanded bead is formed becomes higher upon a heat treatment of the expanded bead. Thus, a high (Bfc:endo) is desirable because a molded article having higher mechanical strengths may be prepared. The upper limit of the endothermic calorific value (Bfc:endo) is generally 70 J/g, preferably 60 J/g. When the endothermic calorific value (Bfc:endo) is excessively small, there is a possibility that the mechanical strengths, especially mechanical strengths at high temperatures, of the final molded article is unsatisfactory. From this point of view, (Bfc:endo) is more preferably 35 J/g or higher.

The exothermic calorific value (Bfc:exo)] is preferably 3 to 20 J/g, more preferably 5 to 15 J/g, for reasons of easiness in controlling the voidage of the molded article. The fact that the exothermic calorific value (Bfc:exo) is low means that crystallization of the PLA resin in the center region of the expanded bead has significantly proceeded before the heat flux differential scanning calorimetry measurement.

The exothermic calorific value (Bfc:exo) and the endothermic calorific value (Bfc:endo) as used herein are determined by the heat flux differential scanning calorimetry (Condition 3) as referenced in JIS K7122 (1987), as described previously. The measurement of the exothermic calorific value (Bfc:exo) and the endothermic calorific value (Bfc:endo) is carried out as follows.

In a first heating run DSC curve (II), when a point where the exothermic peak begins separating from a low temperature-side base line of the exothermic peak is assigned as point "c" and a point where the exothermic peak returns to a high temperature-side base line is assigned as point "d", the exothermic calorific value (Bfc:exo) of the expanded beads is a calorific value determined from the area defined by the line segment (c-d) and the DSC curve. In the first heating run DSC curve (II), when a point where the endothermic peak begins separating from a low temperature-side base line is assigned as point "e" and a point where the endothermic peak returns to a high temperature-side base line is assigned as point "f", the endothermic calorific value (Bfc:endo) of the expanded beads is a calorific value determined from the area defined by the line segment (e-f) and the DSC curve. The DSC device should be preferably operated so that the base line of the first heating run DSC curve (II) is as straight as possible. When the base line is inevitably curved, the curved base line on the low temperature side of the exothermic peak is extended to the high temperature side with the radius of the curvature of the base line being maintained. The point at which the exothermic peak begins separating from the low temperature side curved base line is the point "c". Similarly, the curved base line on the high temperature side of the exothermic peak is extended to the low temperature side with the radius of the curvature of the base line being maintained. The point at which the exothermic peak returns to the high temperature side curved base line is the point "d". Further, the curved base line on the low temperature side of the endothermic peak is extended to the high temperature side with the radius of the curvature of the base line being maintained. The point at which the endothermic peak begins separating from the low temperature side curved base line is the point "e". Similarly, the curved base line on the high temperature side of the endothermic peak is extended to the low temperature side with the radius of the curvature of the base line being maintained. The point at which the endothermic peak returns to the high temperature side curved base line is the point "f".

When it is difficult to determine points "d" and "e" by the above-described method, points "c" and "f" are first determined by the above-described method and a point at which the straight line segment (c-f) intersects the DSC curve is assigned as the point "d" (also point "e"), whereupon the exothermic calorific value (Bfc:exo) and the endothermic calorific value (Bfc:endo) of the expanded beads are determined. When there are a plurality of exothermic (or a plurality of endothermic peaks), the exothermic calorific value (Bfc:exo) (or the endothermic calorific value (Bfc:endo)) is a total area of the plural peaks.

In the above-described measurement of the endothermic calorific values (Bfc:endo) and (Bfc:exo), the sample is measured for its DSC curve under condition 3 including heating rate of 2° C./min. This is for the purpose of separating the positions of the exothermic and endothermic peaks from each other so as to determine the endothermic calorific values (Bfc:endo) and [(Bfc:endo)–(Bfc:exo)] as precisely as possible.

The apparent density of the expanded beads used for producing the molded article is not specifically limited but is preferably 0.025 to 0.25 g/cm$^3$, more preferably 0.03 to 0.15 g/cm$^3$, from the standpoint of production of a molded article having a bulk density of 0.01 to 0.2 g/cm$^3$, reduction of shrinkage of the produced molded article, reduction of variation in the apparent density of the produced molded article, improvement in fusion bonding between the expanded beads of the produced molded article, and improvement in moldability and mechanical properties of the produced molded article.

As used herein, the apparent density of the expanded beads is measured by the following method. The expanded beads are allowed to stand for aging in a constant temperature and humidity room at 23° C. under atmospheric pressure and a relative humidity of 50% for 10 days. In the same room, about 500 mL of the aged expanded beads are weighed to determine their weight W1 (g). The weighed expanded beads are immersed in water at 23° C. contained in a measuring cylinder using a wire net or the like tool. From a rise of the water level volume, the volume V1 (cm$^3$) of the expanded beads placed in the measuring cylinder is determined by subtracting the volume of the wire net and the like tool placed therein. The apparent density (g/cm$^3$) is calculated by dividing the weight W1 of the expanded beads placed in the measuring cylinder by the volume V1 (W1/V1).

The expanded beads used for producing the molded article preferably have an average cell diameter of 30 to 500 μm, more preferably 50 to 250 μm, from the standpoint of their in-mold moldability and improved appearance of the molded article obtained therefrom.

The average cell diameter of the expanded beads is measured as follows. The expanded beads are allowed to stand for aging in a constant temperature and humidity room at 23° C. under atmospheric pressure and a relative humidity of 50% for 10 days, One aged expanded bead is cut into nearly equal halves. From an enlarged image of the cross section taken by a microscope, the average cell diameter is determined. Namely, on the enlarged image of the cross section of the expanded bead, four line segments each passing nearly through the center of the cross section and extending from one surface of the expanded bead to the other surface thereof are drawn such that eight angularly equally spaced straight lines extend radially from nearly the center of the cross section toward the external surface of the expanded bead. The number of the cells that intersect each of the four lines is counted. The total number N of the cells that intersect the above four line segments is counted. Also measured is a total length L (μm) of the four line segments.

The value (L/N) obtained by dividing the total length L by the total number N is an average cell diameter of the one expanded bead. Similar procedures are repeated for randomly-selected 10 expanded beads in total. The arithmetic mean of the average cell diameters of the ten expanded beads represents the average cell diameter of the expanded beads.

The shape of the molded article according to the present invention is not specifically limited. Not only molded article with a plate-like, columnar, vessel-like or block-like form but also a molded article with a complicated three-dimensional shape or an article with a large thickness may be produced.

The molded article having void spaces of the present invention is preferably obtained from the expanded beads having a high temperature peak on the first heating run DSC curve (I) as described above and, therefore, shows excellent fusion bonding between the expanded beads and improved dimensional stability and mechanical strength. Further, when the molded article is heat treated (heat set) for sufficiently increasing the degree of crystallinity of the PLA resin, more excellent heat resistance can be achieved.

A method for preparing the expanded beads and a method for producing the molded article of the present invention will be next described. As the preferred method for preparing the expanded beads, there may be mentioned a dispersing medium release foaming method. By adopting the dispersing medium release foaming method, it is easy to control stretching of cell walls, formation of the high temperature peak and the calorific value of the high temperature peak during a process for expanding resin particles to obtain the expanded beads.

The dispersing medium release foaming method is a method including melting and kneading a PLA resin in an extruder, extruding the kneaded resin in the form of strands, cutting the extrudate to obtain resin particles (resin particle preparation step), dispersing the resin particles in a dispersing medium contained in a pressure resisting vessel, impregnating a physical blowing agent into the resin particles, while heating them, to obtain foamable resin particles (blowing agent impregnation step), and releasing the foamable resin particles together with the dispersing medium, at a high temperature and a high pressure, from the pressure resisting vessel into a lower pressure atmosphere to obtain expanded beads (foaming step). While the resin particle preparation step, blowing agent impregnation step and foaming step may be performed separately, the blowing agent impregnation step and the foaming step are generally carried out in a single stage.

In the resin particle preparation step, resin particles may be prepared by extruding a PLA resin into which required additives have been incorporated, the extrudate being then pelletized by, for example, a strand cutting method or an under-water cutting method. When the above-described multi-layered resin particles each composed of a core layer and an outer layer are intended to be produced, there may be utilized a coextrusion molding technique which is disclosed in, for example, Japanese Kokoku Publications Nos. JP-B-S41-16125, JP-B-S43-23858 and JP-B-S44-29522 and Japanese Kokai Publication No. JP-A-S60-185816 and which uses, for example, a device including an extruder for forming the core layer, an extruder for forming the outer layer, and a coextrusion die connected to each of the extruders. The use of the multi-layered resin particles is preferable to produce the expanded beads that satisfy the above formula (2). The expanded beads that satisfy the above formula (1)

may be suitably produced by using PLA resin having Rr:endo (described hereinafter) of more than 25 J/g.

In pelletization in the resin particle preparation step, a PLA resin and, if needed, additives are fed to an extruder and melted and kneaded. The molten kneaded mass thus obtained is extruded in the form of strands through small holes of a mouthpiece attached to a die exit at a tip of the extruder. The extruded strands are cooled by being immersed in water and then cut with a pelletizer such that the resin particles obtained each have a specific weight, whereby resin particles are obtained. Alternatively, such resin particles may be obtained by cutting the extruded strands into resin particles each have a specific weight, the resin particles being cooled after or simultaneous with the cutting.

The resin particles preferably have an average weight per one particle of 0.05 to 10 mg, more preferably 0.1 to 4 mg. When the average weight is excessively small, it is necessary to use a special production method. When the average weight is excessively large, on the other hand, there is a possibility that the expanded beads obtained therefrom have a broad density distribution and cannot be filled in a mold cavity in an efficient manner at the time of molding. The shape of the resin particles may be, for example, a cylindrical column, a sphere, a rectangular column, an oval sphere or a cylinder. Expanded beads obtained by foaming and expanding the resin particles have a shape that is similar to that of the resin particles before expansion.

Before initiating the resin particle producing step, it is preferable to dry the PLA resin for reasons of prevention of degradation of the PLA resin by hydrolysis. In order to suppress degradation of the PLA resin by hydrolysis, a method using an extruder provided with a vent hole may also be adopted so that moisture is removed from the PLA resin by evacuation through the vent hole. The removal of moisture from the PLA resin may permit the prevention of the generation of bubbles in the resin particles and may improve the stability of the extrusion process.

In the dispersing medium release foaming method, resin particles are dispersed in a dispersing medium, such as, water in a pressure resisting vessel, such as an autoclave, to which a blowing agent is fed under a pressure in a predetermined amount. The dispersion is then stirred at an elevated temperature for a predetermined time to impregnate the blowing agent into the resin particles to obtain foamable resin particles. The resin particles in the softened state and the dispersing medium in the vessel are then released from the high temperature and high pressure vessel into a lower temperature and lower pressure atmosphere to obtain the expanded beads. At the time of the release, it is preferred that the contents in the vessel are discharged while applying a back pressure to the space in the vessel.

An additive may be previously incorporated into the resin particles for the purpose of controlling the apparent density and cell diameter of the obtained expanded beads. Examples of the additive include an inorganic powder such as talc, calcium carbonate, borax, zinc borate, aluminum hydroxide and silica, and a polymer such as polytetrafluoroethylene, polyethylene wax, polypropylene wax, polycarbonate and crosslinked polystyrene. Among the above additives, polytetrafluoroethylene, polyolefin wax and crosslinked polystyrene are preferred. Particularly preferred is hydrophobic polytetrafluoroethylene powder and polyethylene wax.

The additive may be kneaded as such together with the PLA resin in the pelletization step. For reasons of improved dispersibility, however, it is preferred that the additive is formed into a master batch and the master batch is then kneaded with the PLA resin.

Since the apparent density and cell diameter of the expanded beads vary depending upon the blending amount of the additive, it is expected that the additive has an effect of controlling these properties. The amount of the additive is generally 0.001 to 5 parts by weight, preferably 0.005 to 3 parts by weight, more preferably 0.01 to 2 parts by weight, per 100 parts by weight of the PLA resin. Within such a range, it is possible to reduce the apparent density (to increase the expansion ratio) and to uniformize the cell diameter of the expanded beads.

Since the PLA resin is easily hydrolyzed, the additive to be blended with the PLA resin is desired to be selected from hydrophobic substances while avoiding the use of a hydrophilic substance as much as possible. Thus, when a hydrophobic additive is used, it is possible to obtain an effect of the additive while preventing degradation of the PLA resin due to hydrolysis.

The high temperature peak of the expanded beads preferably has an endothermic calorific value of 5 to 20 J/g. The calorific value may be adjusted within the above range during the course of the blowing agent impregnation step in which the resin particles placed within a pressure resisting vessel are heated at a temperature at which crystals thereof are not completely melted. The heat treatment is carried out by holding the resin particles at a specific temperature and for a specific period of time as described below. The temperature at which the high temperature peak is allowed to develop is generally in the range from [melting point minus 30° C.] to [melting point minus 10° C.] where the melting point is that of the PLA resin of which the resin particles are formed, although the temperature varies depending upon the kind of the blowing agent and the aimed apparent density of the expanded beads. The heat treatment time is generally 5 to 60 minutes, preferably 5 to 30 minutes. Too long a heat treatment time may cause hydrolysis of the PLA resin and is not preferred. Thus, the resin particles are preferably held in the above temperature range for at least 5 minutes in order for the high temperature peak to develop in the expanded beads.

When particularly low apparent density (high expansion ratio) expanded beads are to be produced, there may be adopted so-called two-step expansion in which expanded beads produced in the above method are aged in an atmospheric pressure in the customarily employed manner, then charged again in a pressure resisting vessel and subjected to a pressurizing treatment (bead internal pressure increasing treatment) using a pressurized gas such as air so that the internal pressure of the expanded beads is increased to 0.01 to 0.10 MPa(G) and, finally, heated in the expansion vessel with a heating medium, such as hot wind, steam or a mixture of steam and air, to obtain the desired expanded beads with a high expansion ratio.

In the production of expanded beads, the foaming temperature is preferably between (melting point minus 10° C.) to (melting point minus 30° C.), more preferably between (melting point minus 15° C.) to (melting point minus 25° C.), where the melting point is that of the PLA resin. When the foaming temperature is excessively low, it is difficult to obtain expanded beads with a low apparent density. When excessively high, on the other hand, shrinkage of the expanded beads is apt to occur and, thus, there is a possibility that the mechanical properties of molded articles obtained by in-mold molding of the obtained beads are deteriorated.

A dispersing agent or a dispersing aid may be added to the dispersing medium, if necessary, when dispersing the resin particles in the dispersing medium. Examples of the dispersing agent include inorganic substances such as aluminum oxide, tribasic calcium phosphate, magnesium pyrophosphate, titanium oxide, zinc oxide, basic magnesium carbonate, basic zinc carbonate, calcium carbonate, kaolin, mica and clay; and water soluble polymer protective colloid agents such as polyvinylpyrrolidone, polyvinyl alcohol and methyl cellulose. The dispersing medium may also be incorporated with a dispersing aid such as an anionic surfactant, e.g. sodium dodecylbenzenesulonate and sodium alkanesulfonate.

The dispersing agent may be used in an amount of 0.05 to 3 parts by weight per 100 parts by weight of the resin particles, while the dispersing aid may be used in an amount of 0.001 to 0.3 part by weight per 100 parts by weight of the resin particles.

As the physical blowing agent, there may be used, for example, organic physical blowing agents such as hydrocarbons (e.g. butane, pentane and hexane), alicyclic hydrocarbon and halogenated hydrocarbons (e.g. 1,3,3,3-tetrafluoro-1-propene, 2,3,3,3-tetrafluoro-1-propene, trans-1-chloro-3,3,3-trifluoropropene), ether such as diethyl ether, alcohol such as methanol and inorganic physical blowing agents such as carbon dioxide, nitrogen, air and water. These physical blowing agents may be used singly or in combination of two or more thereof. Among the physical blowing agents, those which are composed mainly of an inorganic physical blowing agent such as carbon dioxide, nitrogen and air are preferably used. Carbon dioxide is particularly preferred. The term "physical blowing agent composed mainly of an inorganic physical blowing agent" as used herein is intended to refer to a physical blowing agent which contains at least 50% by mole, preferably at least 70% by mole, more preferably at least 90% by mole, of an inorganic physical blowing agent in 100% by mole of the total physical blowing agent.

The amount of the physical blowing agent is determined as appropriate in consideration of the kind of the blowing agent, amount of the additives, the apparent density of the desired expanded beads, etc. For example, the inorganic physical blowing agent is used in an amount of about 0.1 to 30 parts by weight, preferably 0.5 to 15 parts by weight, more preferably 1 to 10 parts by weight, per 100 parts by weight of the PLA resin.

The molded article of the present invention may be produced by using conventional in-mold molding device. It is not necessary to perform procedures for increasing the secondary expansion performance of the expanded beads. Namely, by utilizing the secondary expansion suppressing effect that is given to the expanded beads showing a high temperature peak, the desired molded article may be easily produced by in-mold molding, without need of a bead internal pressure increasing treatment and without greatly increasing the amount of the expanded beads introduced into the mold cavity. For example, when a cracking molding method is adopted for producing a molded article having a voidage of 5 to 45%, the expanded beads showing a high temperature peak are fed, without a bead internal pressure increasing treatment, to the cavity of the mold having a relatively low degree of cracking so that the compression percentage of the expanded beads is preferably 20% or less, still more preferably 10% or less, more preferably 5% or less. As used herein the term "compression percentage" refers to a value calculated from the formula:

Compression percentage(%)=100×(($V_1$-$V_0$)/$V_0$)

wherein $V_0$ is a volume of the molded article and $V_1$ is a bulk volume of the expanded beads supplied to the mold cavity.

As the generally preferably adopted in-mold molding method, there may be mentioned a batch-type in-mold molding method in which expanded beads are filled in a mold cavity of a conventional mold for thermoplastic resin expanded beads adapted to be heated and cooled and to be opened and closed. A heating medium such as steam or a mixture of steam and air is then fed to the mold cavity to heat the expanded beads and to expand and fuse bond the expanded beads together. The obtained molded article is then cooled and taken out of the mold cavity. In the production of molded articles having a voidage of 8 to 45%, steam having a lower vapor pressure than that generally employed in the ordinary in-mold molding, is suitably used. Namely, steam having a saturation vapor pressure of 0.01 to 0.15 MPa(G), preferably 0.01 to 0.10 MPa(G), is preferably used.

The feed of the steam may be carried out by a conventional method such as a combination of one-direction flow heating, reversed one-direction flow heating and both-direction flow heating. The particularly preferred heating method includes preheating, one-direction flow heating, reversed one-direction flow heating and both-direction flow heating which are successively performed in this order.

The molded article of the present invention which is constituted of biodegradable expanded beads and which has void spaces formed between the expanded beads, is useful as a plastic article in various fields such as automobile, construction and civil engineering, and may be suitably used in various applications such as sound proof materials, water permeable materials, cushioning materials and core materials of FRP.

The following examples and comparative examples will further illustrate the invention. The scope of the invention is not limited to the examples in any way.

Commercially available PLA resins, PLA1, PLA2 and PLA3, were used in the examples and comparative examples. Details of PLA1, PLA2 and PLA3 are shown in Table 1.

TABLE 1

|  | PLA1 | PLA2 | PLA3 |
| --- | --- | --- | --- |
| Maker | Nature Works LLC | Nature Works LLC | Nature Works LLC |
| Grade | Ingeo 2003D | Ingeo 4060D | Ingeo 4032D |
| Crystalline/non-crystalline | crystalline | non-crystalline | crystalline |
| D-isomer content (%) | 4.1 | 11.8 | 1.5 |
| Rr:endo (J/g) | 33 | 0 | 42 |
| Melting point (° C.) | 155 | not confirmed | 168 |
| MFR (g/10 min) | 2.8 | 4.4 | 3.1 |
| Vicat softening point (° C.) | not measured | 58 | 157 |

In Table 1, Rr:endo represents an endothermic calorific value (heat of fusion) of the raw material PLA resin and is determined in the same manner as the above-described method for determining Br:endo of expanded beads except for using the raw material PLA resin as a measurement sample. The Br:endo of expanded beads is equal to the Rr:endo of the PLA resin from which the expanded beads are produced. In Table 1, MFR is measured according to JIS K7210 (1976), method A at a temperature of 190° C. and a load of 2.16 kgf (21.2N).

The melting point shown in Table 1 is measured by heat flux differential scanning calorimetry according to JIS K7121 (1987). Specifically, the melting point is determined as a peak top temperature of the fusion peak on a DSC curve obtained using a heating speed of 10° C./min. The DSC curve is measured after the measurement sample has been subjected to a determined heat treatment according to "3. Conditioning of Test Samples (2)" of JIS K7121 (1987). When the DSC curve shows two or more fusion peaks, the melting point is the peak top temperature of the fusion peak that has the largest area among them.

Examples 1 to 9 and Comparative Examples 1 and 2

An extrusion device was used which had an extruder (inside diameter: 65 mm) for forming a core layer, an extruder (inside diameter: 30 mm) for forming an outer layer and a coextrusion die attached to exits of the two extruders for forming multi-layered strands. The PLA resins shown in Table 2 for forming core and outer layers were fed to respective extruders and melted and kneaded. The molten kneaded masses were introduced into the coextrusion die, combined in the die and coextruded in the form of multi-layer strands through small holes of a mouthpiece of the coextrusion die attached to a tip of the extrusion device. Each of the strands had a core layer and an outer layer covering the core layer with a weight ratio (core layer/outer layer) shown in Table 1. The coextruded strands were cooled with water and then cut with a pelletizer into particles each having a weight 2 mg. Drying of the cut particles gave multi-layered resin particles.

Meanwhile, the PLA resin of the core layer contained 1,000 ppm by weight of polytetrafluoroethylene powder (Trade name: TFW-1000, manufactured by Seishin Enterprise Co., Ld.) as a cell controlling agent and 1.5% by weight of a carbodiimide compound (bis(dipropylphenyl) carbodiimide, Stabaxol 1-LF produced by Rhein Chemie) as an end capping agent. The cell controlling agent and end capping agent were mixed into the PLA resin in the form of a master batch. The PLA resin of the outer layer contained 1.5% by weight of a carbodiimide compound (bis(dipropylphenyl)carbodiimide, Stabaxol 1-LF produced by Rhein Chemie) as an end capping agent. The end capping agent was mixed into the PLA resin in the form of a master batch.

The MFR, glass transition temperature and melting point of the resin particles are shown in Table 2.

Using the thus obtained resin particles, expanded beads were prepared. First, 1 kg of the obtained resin particles were charged in a 5 L pressure resisting vessel (autoclave) equipped with a stirrer together with 3 L of water as a dispersing medium, to which 1 g of aluminum oxide as a dispersing agent and 0.1 g (as effective amount) of a surfactant (sodium alkylbenzenesulfonate, Trade name: Neogen S-20F, manufactured by Dai-ichi Kogyou Seiyaku Co., Ltd.) were added. The contents in the vessel were then heated with stirring to the foaming temperature shown in Table 2. Carbon dioxide ($CO_2$) as a blowing agent was then injected into the pressure resisting vessel until the pressure within the pressure resisting vessel reached the value shown in Table 2. After having been allowed to stand at the foaming temperature for 15 minutes, the contents were released from the pressure resisting vessel (inside temperature and pressure of the vessel were the foaming temperature and the inside pressure shown in Table 2, respectively) to the atmospheric having an ambient temperature and an ambient pressure while applying a back pressure with carbon dioxide to maintain the pressure within the vessel at constant, whereby expanded beads having an apparent density as shown in Table 2 were obtained.

DSC analysis of the obtained expanded beads revealed that the expanded beads obtained in Examples 1 to 9 and Comparative Example 2 each had a crystal structure that showed an intrinsic peak and a high temperature peak on the first heating run on DSC curve (I) thereof. The expanded beads obtained in Comparative Example 1 had a crystal structure that showed only an intrinsic peak on the first heating run DSC curve (I).

Physical properties of the thus obtained expanded beads such as various calorific values, apparent density, closed cell content, average cell diameter, were measured and evaluated. The results are shown in Table 2.

TABLE 2

| | | Example | | | | | |
|---|---|---|---|---|---|---|---|
| | | 1 | 2 | 3 | 4 | 5 | 6 |
| Resin Particles | PLA resin of core layer | PLA1 | PLA1 | PLA1 | PLA1 | PLA1 | PLA1 |
| | PLA resin of outer layer | PLA2 | PLA2 | PLA2 | PLA2 | PLA2 | PLA2 |
| | Core layer/Outer layer (weight ratio) | 95/5 | 95/5 | 95/5 | 95/5 | 95/5 | 95/5 |
| | MFR (g/10 min) | 3.4 | 3.4 | 3.4 | 3.4 | 3.4 | 3.4 |
| | Glass transition temperature (° C.) | 56 | 56 | 56 | 56 | 56 | 56 |
| | Melting point (° C.) | 155 | 155 | 155 | 155 | 155 | 155 |
| Expanded Beads | Autoclave inside pressure (MPa(G)) | 4.0 | 4.0 | 4.0 | 3.5 | 2.5 | 2.0 |
| | Foaming temperature (° C.) | 132.0 | 132.0 | 131.5 | 132.0 | 135.5 | 135.5 |
| | Apparent density (g/cm$^3$) | 0.06 | 0.06 | 0.07 | 0.10 | 0.10 | 0.13 |
| | High temperature peak total calorific value (J/g) | 6 | 6 | 8 | 11 | 7 | 10 |
| | Br:endo (J/g) | 33 | 33 | 33 | 33 | 33 | 33 |
| | Brs:endo (J/g) | 24 | 24 | 24 | 25 | 24 | 25 |
| | Brc:endo (J/g) | 33 | 33 | 33 | 33 | 33 | 33 |
| | Bfc:exo (J/g) | 11 | 11 | 10 | 4 | 5 | 9 |
| | Bfc:endo (J/g) | 31 | 31 | 33 | 33 | 33 | 32 |
| | Bfc:endo − Bfc:exo (J/g) | 20 | 20 | 23 | 29 | 27 | 23 |
| | Closed cell content (%) | 95 | 95 | 95 | 95 | 95 | 94 |
| | Average cell diameter (μm) | 88 | 88 | 122 | 117 | 131 | 110 |

| | | Example | | | Comparative Example 1 | Comparative Example 2 |
|---|---|---|---|---|---|---|
| | | 7 | 8 | 9 | | |
| Resin Particles | PLA resin of core layer | PLA3 | PLA1 | PLA3 | PLA1 | PLA1 |
| | PLA resin of outer layer | PLA2 | PLA2 | PLA2 | PLA2 | PLA2 |

TABLE 2-continued

| | | | | | | |
|---|---|---|---|---|---|---|
| Expanded Beads | Core layer/Outer layer (weight ratio) | 95/5 | 95/5 | 95/5 | 95/5 | 95/5 |
| | MFR (g/10 min) | 3.7 | 3.4 | 3.4 | 3.4 | 3.4 |
| | Glass transition temperature (° C.) | 56 | 56 | 56 | 56 | 56 |
| | Melting point (° C.) | 169 | 155 | 155 | 155 | 155 |
| | Autoclave inside pressure (MPa(G)) | 3.5 | 3.5 | 4.5 | 3.5 | 1.5 |
| | Foaming temperature (° C.) | 142.0 | 133.5 | 140.0 | 136.0 | 138.0 |
| | Apparent density (g/cm$^3$) | 0.06 | 0.06 | 0.08 | 0.08 | 0.25 |
| | High temperature peak total calorific value (J/g) | 14 | 4 | 21 | 0 | 9 |
| | Br:endo (J/g) | 42 | 33 | 42 | 33 | 33 |
| | Brs:endo (J/g) | 32 | 24 | 32 | 25 | 25 |
| | Brc:endo (J/g) | 42 | 33 | 42 | 33 | 33 |
| | Bfc:exo (J/g) | 5 | 13 | 3 | 19 | 12 |
| | Bfc:endo (J/g) | 42 | 33 | 42 | 27 | 32 |
| | Bfc:endo − Bfc:exo (J/g) | 37 | 20 | 39 | 8 | 20 |
| | Closed cell content (%) | 94 | 94 | 94 | 94 | 94 |
| | Average cell diameter (μm) | 69 | 101 | 72 | 101 | 113 |

Next, molded articles were prepared using the expanded beads obtained in the foregoing Examples and Comparative Examples. The expanded beads obtained were placed and compressed in the compression percentage shown in table 3 as such (without being subjected to an inside pressure imparting treatment) in a cavity of the flat plank mold having a length of 200 mm, a width of 250 mm and a thickness of 50 mm and in-mold molded by steam heating to obtain molded articles in the form of a plank having interconnected void spaces between the expanded beads.

The heating with steam was performed as follows. Steam with a source pressure of 0.6 MPa(G) was fed to the mold for 5 seconds for preheating in such a state that drain valves on both stationary and moveable mold sides were maintained in an open state (purging step). Next, while maintaining the drain valve on the stationary mold side in an open state and the drain valve on the moveable mold side in a closed state, steam with a source pressure of 0.3 MPa(G) was fed from the moveable mold side for 3 seconds. Then, while maintaining the drain valve on the moveable mold in an open state and the drain valve on the stationary mold side in a closed state, steam with a source pressure of 0.3 MPa(G) was fed from the stationary mold side for 3 seconds. Thereafter, with drain valves kept closed, steam at the heating steam pressure (molding vapor pressure) shown in Table 3 was fed to the mold to heat the expanded beads for 8 seconds. After completion of the heating, cooling with water was carried out until a surface pressure attributed to the expanding force of the molded article was reduced to 0.01 MPa(G). The molds were then opened and the molded product was taken out therefrom. The molded product was aged for drying in an oven at 40° C. for 15 hours, then aged for heat treatment in another oven at 70° C. for 15 hours, and thereafter allowed to gradually cool to room temperature to obtain a molded article having interconnected void spaces between the fuse-bonded expanded beads.

Each of the thus prepared molded articles were evaluated for their various physical properties including bulk density, shrinkage, reproducibility of the shape of the mold cavity, voidage, flexural strength, and 50% compression stress. The results are summarized in Table 3.

TABLE 3

| | Example | | | | | | | | | Comparative Example 1 | Comparative Example 2 |
|---|---|---|---|---|---|---|---|---|---|---|---|
| | 1 | 2 | 3 | 4 | 5 | 6 | 7 | 8 | 9 | | |
| Bead internal pressure (MPa(G)) | 0 | 0 | 0 | 0 | 0 | 0 | 0 | 0 | 0 | 0 | 0 |
| Compression percentage (%) | 5 | 5 | 10 | 15 | 5 | 20 | 10 | 5 | 10 | 10 | 15 |
| Molding vapor pressure (MPa(G)) | 0.04 | 0.08 | 0.06 | 0.06 | 0.02 | 0.06 | 0.08 | 0.06 | 0.08 | 0.02 | 0.10 |
| Bulk density (g/cm$^3$) | 0.04 | 0.04 | 0.05 | 0.07 | 0.07 | 0.10 | 0.05 | 0.04 | 0.06 | 0.04 | 0.25 |
| Shrinkage (%) | 2.0 | 2.0 | 2.0 | 1.8 | 2.0 | 1.8 | 1.8 | 2.2 | 1.8 | 3.2 | 2.6 |
| Reproducibility of the shape of mold cavity | good | good | good | good | good | good | good | fair | good | poor | good |
| Voidage (%) | 13 | 11 | 22 | 25 | 21 | 12 | 26 | 8 | 30 | — | 21 |
| 50% Compression stress (MPa) | 0.45 | 0.46 | 0.61 | 1.00 | 0.85 | 1.25 | 0.54 | 0.44 | 0.78 | — | 2.73 |
| Flexural strength (MPa) | 0.52 | 0.59 | 0.46 | 0.60 | 0.64 | 1.38 | 0.34 | 0.50 | 0.38 | — | 1.31 |
| Flexural strength/Bulk density (MPa · cm$^3$/g) | 13 | 15 | 9 | 9 | 9 | 14 | 7 | 13 | 6 | — | 5 |

In Table 2, the endothermic calorific value of the high temperature peak, endothermic calorific values (Br:endo), (Brc:endo), (Brs:endo) and (Bfc:endo), exothermic calorific value (Bfc:exo), apparent density, closed cell content and average cell diameter of the expanded beads are measured by the methods described previously.

The MFR and melting point of the resin particles shown in Table 2 were measured in the same ways as those described previously in connection with the raw material PLA resins.

The glass transition temperature of the resin particles shown in Table 2 is a midpoint glass transition temperature as measured using heat flex differential scanning calorimeter in accordance with JIS K7121 (1987). The measurement sample for determining the glass transition temperature was first subjected to a conditioning treatment in accordance with "a case where the glass transition temperature is measured after the sample has been heat treated under specified conditions" as described in JIS K7121-1987, Paragraph 3, Control of conditions of sample (3). Namely, the test piece was first heated to 200° C. at a heating speed of 10° C./min and then immediately cooled to 0° C. at a cooling speed of 10° C./min. After the conditioning treatment, the measurement sample was measured for its glass transition temperature.

The bulk density and flexural strength of the molded articles shown in Table 3 were measured in the same ways as those described previously.

The shrinkage of the molded articles shown in Table 3 was measured as follows. Each of the aforementioned aged molded articles was measured for its length L2 (mm) in the widthwise direction. The shrinkage (%) of the molded article was then calculated from the formula: Shrinkage (%)=100× (L1−L2)/L1 wherein L1 is 250 mm (width of the molded cavity).

The voidage shown in Table 3 was measured in the same ways as those described previously. The arithmetic mean of the five repeated measurement values represents the shrinkage of the expanded beads molded article (n=5).

The 50% compression stress shown in Table 3 was measured as follows. A test piece (without skin) having a length of 50 mm, a width of 50 mm and a thickness of 25 mm was cut out from the molded article and was subjected to a compression test in which the test piece was compressed in the thickness direction at a compression rate of 10 mm/min according to JIS K6767 (1999) to determine 50% compression stress of the molded article.

The reproducibility of the shape of the mold cavity shown in Table 3 was evaluated by the following method. The thickness of each of the molded articles (corresponding to the 50 mm thickness of the mold cavity) was measured at five different locations. The size variation was evaluated based on the following criteria:

Good: Difference between the largest and the smallest of the measured thicknesses is 2 mm or less and deformation is not at all observed.

Fair: Difference between the largest and the smallest of the measured thicknesses is 2 mm or less and slight deformation is observed.

Poor: Difference between the largest and the smallest of the measured thicknesses is greater than 2 mm.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein. The teachings of Japanese Patent Application No. 2014-94864, filed May 1, 2014, inclusive of the specification, claims and drawings, are hereby incorporated by reference herein.

What is claimed is:

1. A polylactic acid-based resin foamed molded article having interconnected void spaces and comprising a multiplicity of polylactic acid-based resin expanded beads that are fusion-bonded to each other to define the interconnected void spaces therebetween, said foamed molded article having a voidage of 10 to 45% by volume, a bulk density BD [g/cm$^3$] of 0.01 to 0.2 g/cm$^3$ and a ratio FT/BD of a flexural strength FT [MPa] thereof to the bulk density BD in the range of 6 to 25 MPa·cm$^3$/g, and said polylactic acid-based resin expanded beads showing at least one high temperature peak having a peak top temperature higher than a reference temperature and at least one low temperature peak having a peak top temperature equal to or lower than the reference temperature on a first heating run DSC curve obtained when a measurement samples from the polylactic acid-based resin expanded beads is heated from 23° C. to a first temperature higher by 30° C. than a fusion peak ending temperature at a heating speed of 10° C./min according to heat flux differential scanning calorimetry referenced in JIS K7122(1987), wherein said reference temperature is a peak top temperature of an endothermic peak that is located on the highest temperature side on a second heating run DSC curve obtained when the measurement sample, after having been maintained at said first temperature for 10 minutes and then cooled to 30° C. at a cooling speed of 10° C./min, is heated from 30° C. to a second temperature higher by 30° C. than a fusion peak ending temperature at a heating speed of 10° C./min according to heat flux differential scanning calorimetry referenced in JIS K7122(1987), wherein when the second time DSC curve has only one fusion peak, said reference temperature is a peak top temperature thereof, and when the second time DSC curve has a plurality of fusion peaks or when there is a shoulder on high temperature side of a fusion peak, said reference temperature is the highest among the peak top temperatures of the plural fusion peaks and flection point temperatures of the shoulders, wherein the polylactic acid-based resin expanded beads have a closed cell content of at least 80%, and wherein said expanded beads showing an endothermic calorific value of (Br:endo) [J/g], when a measurement sample of said expanded beads is heated, after having been subjected to a pretreatment, by heat flux differential scanning calorimetry from 40° C. at a heating speed of 2° C./min in accordance with JIS K7122 (1987), said pretreatment including maintaining the measurement sample at a temperature higher by 30° C. than a fusion peak ending temperature thereof for 10 minutes, then cooling the molten measurement sample to 110° C. at a cooling speed of 2° C./min, then maintaining the cooled measurement sample at 110° C. for 120 min, and then cooling the resulting measurement sample to 40° C. at a cooling speed of 2° C./min, and wherein (Br:endo) meets the following equation (1):

$$(Br\text{:endo}) > 25 \tag{1}$$

2. The polylactic acid-based resin foamed molded article according to claim 1, wherein said at least one high temperature peak has a total calorific value of 5 to 20 J/g.

3. The polylactic acid-based resin foamed molded article according to claim 1, wherein each of the expanded beads comprises:

an exterior surface, a surface region including an entirety of the exterior surface and having a weight of one-sixth to one-fourth the weight of the expanded bead, and a center region located inside the surface region and having a weight of one-fifth to one-third the weight of the expanded bead, wherein said surface region and said center region show endothermic calorific values of (Brs:endo) [J/g] and (Brc:endo) [J/g], respectively, when measurement samples of said surface region and said center region are each heated, after having been subjected to a pretreatment, by heat flux differential scanning calorimetry from 40° C. at a heating speed of 2° C./min in accordance with JIS K7122(1987), said pretreatment including maintaining the measurement sample at a temperature higher by 30° C. than a fusion peak ending temperature thereof for 10 minutes, then cooling the molten measurement sample to 110° C. at a cooling speed of 2° C./min, then maintaining the cooled measurement sample at 110° C. for 120 min, and then cooling the resulting measurement sample to 40° C. at a cooling speed of 2° C./min, and wherein (Brs:endo) and (Brc:endo) meet the following equation (2):

$$(Brc\text{:endo}) > (Brs\text{:endo}) \geq 0 \tag{2}.$$

4. The polylactic acid-based resin foamed molded article according to claim 1, wherein the expanded beads used to produce the molded article are such that an endothermic calorific value (Bfc:endo) [J/g] and an exothermic calorific value (Bfc:exo) of a center region of the expanded bead, which values are determined in accordance with heat flux differential scanning calorimetry referenced in JIS K7122 (1987) meet the following formula (3):

$$30 \geq [(Bfc\text{:endo}) - (Bfc\text{:exo})] > 15 \tag{3}$$

wherein the endothermic calorific value (Bfc:endo) and the exothermic calorific value (Bfc:exo) are determined from a DSC curve obtained by heating, for melting, 1 to 4 mg of a measurement sample, sampled from the center region of the expanded bead, from 23° C. to a temperature higher by 30° C. than a fusion peak ending temperature at a heating speed of 2° C./min in accordance with heat flux differential scanning calorimetry referenced in JIS K7122 (1987), wherein the measurement sample is prepared by cutting away an entire surface portion of the expanded bead to leave the measurement sample, such that the measurement sample has a weight of ⅕ to ⅓ the weight of the expanded bead before being cut.

5. The molded article according to claim 1, wherein the voidage is 10 to 35%.

6. The molded article according to claim 1, wherein the voidage is 15 to 30%.

7. The molded article according to claim 1, wherein the shrinkage of the molded article is between 1.8 and 2.2%.

8. The molded article according to claim 1, wherein the foamed molded article has an average cell diameter of 30 to 500 μm.

* * * * *